Figure 1:
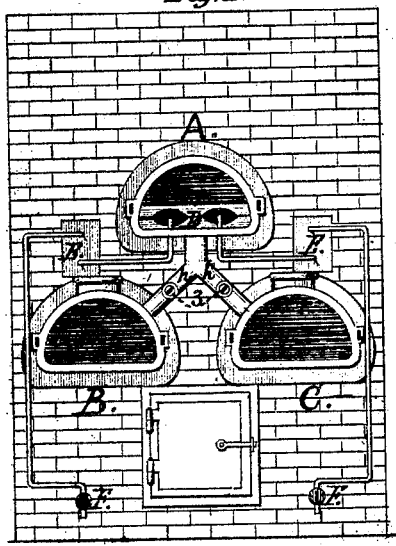

Improvements in Manufacturing Illuminating Gas.

George W. Harris, Elizabeth, N.J., & Henry Holdrege, New York, Inventors.

No. 94596

PATENTED SEP. 7 1869

Witnesses.

Inventors.

UNITED STATES PATENT OFFICE.

GEORGE W. HARRIS, OF ELIZABETH, NEW JERSEY, AND H. HOLDREGE, OF NEW YORK, N. Y.

IMPROVEMENT IN THE MANUFACTURE OF ILLUMINATING-GAS.

Specification forming part of Letters Patent No. 94,596, dated September 7, 1869.

*To all whom it may concern:*

Be it known that we, GEORGE W. HARRIS, of the city of Elizabeth, Union county, State of New Jersey, and HENRY HOLDREGE, of the city of New York, in the county of New York and State of New York, have invented certain new and useful Improvements in the Manufacture of Illuminating-Gas; and we do hereby declare that the following is a full, clear, and exact description thereof, and of their mode or manner of operation, reference being had to the accompanying drawings, and to the letters of reference marked thereon, and making a part of this specification.

Our inventions or improvements have more particular relation to what is known as the hydrocarbon-gas process, and are intended to be used in connection therewith; and, by our such inventions, we avoid the difficulties and uncertainties which have caused the failure of other inventions devised for the same purpose, and also produce an illuminating-gas which is substantially a new product, hitherto unknown to those skilled in the art. We distinguish our invention or process as "The American System for the Production of Illuminating-Gas by the Hydrocarbon Process."

Our inventions or improvements consist, first, in an improved construction of retort for decomposing the steam; second, in an improved mode of distributing the superheated steam in the decomposing retort; third, in combining with the decomposing-retort and steam-superheater, a suitable device for drying the steam before it is superheated and passes to the decomposing-retort; fourth, in an improved manner or mode of conducting the gases from the decomposing-retorts to the carbonizing or bituminous retorts, so as to secure a more regular and uniform union or mixture of the several gases or vapors, and thereby produce a better article of illuminating-gas; fifth, in uniting and combining these inventions or improvements, with suitable apparatus, as hereafter mentioned, into a system or process, which, we believe, is new and useful, for the purpose of producing illuminating-gas of superior quality from any of the hydrocarbons suited to the manufacture of gas; sixth, in the production, as the result of the use of our inventions, of a new and useful product in the combined or perfected gas, which experiment has shown to be of a permanence hitherto unknown in illuminating-gas made by the old methods, inasmuch as it does not part with or lose its illuminating qualities by long-continued exposure to cold, even when of extreme degree, which, as is well known to all who are familiar with or skilled in the art of gas making, is a most important cause of loss in illuminating power in ordinary gas.

We are well advised that very numerous inventions have been patented, both in the United States and elsewhere, for the decomposition of water by highly-heated carbon, or by metals, for the purpose of producing gas for illumination or heating; but these inventions have failed, from various causes, which we have discovered and have obviated by our inventions or improvements, and which constitute, whether regarded separately or collectively, a new and peculiar system, hitherto unknown.

That the several novel and useful inventions and combinations may be better understood by those skilled in the art, we now proceed to describe them, and for that purpose we employ the annexed drawings, which form a part of this our specification.

Figure 2:
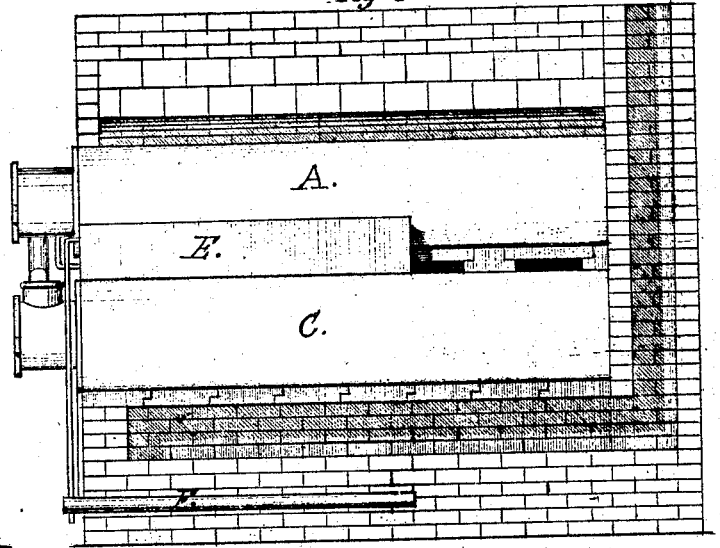
Figure 3:
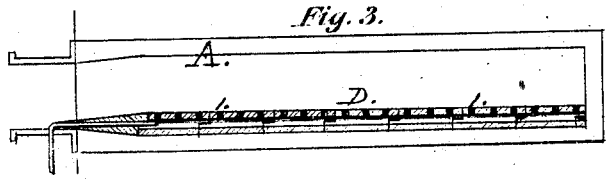
Figure 4:
Figure 5:
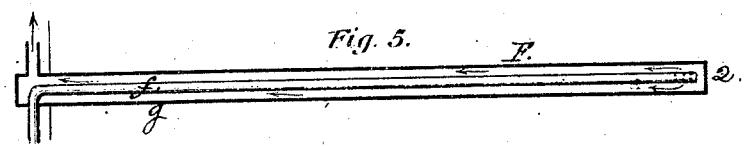
Figure 6:

Figure 1 is a front view of a bench of three retorts, with their connections, containing our improvements and inventions. Fig. 2 is a side view of the same bench. Fig. 3 is a sectional view of the decomposing-retort and its perforated tile bottom. Fig. 4 is a detached view of a section of perforated tile. Fig. 5 is a sectional view of the steam-drier. Fig. 6 is a sectional view of the steam-superheater.

A bench of three or more retorts is made use of, as in ordinary gas-works, one or more of which is used for the purpose of decomposing highly-superheated steam and converting it into hydrogen and carbonic oxide gases, for the purpose of being mixed and united with the gases produced in the retorts filled with bituminous coal or other hydrocarbons. In the bench of three retorts, shown in Fig. 1, the retort A is used for decomposing the superheated steam, and the other retorts B and C are carbonizing or bituminous retorts.

The retort A is best made of fire-clay of close texture and of tenacious quality, in the selection of which regard should be had to the qualities which are found in the best German and similar clays, so that, in the process of manufacturing the retort, the clays will, while in the kiln, have a tendency to flux, instead of forming a porous and brittle mass, liable to disintegration.

In the bottom of such retort is placed a hollow or chambered and perforated tile bottom, D, as shown in Fig. 3, and a perspective view of a portion of which is represented in Fig. 4. This tile may be made entire of a size suitable for the retort, but may be best made in sections, with lapping flanges, as shown in Fig. 4. These tiles are best made of the same material as the retort containing them, and are formed with both a top and bottom surface, $a$ $b$, between which are chambers or passages $c$ $c$ for the reception of the superheated steam, which is admitted at the front end, near the mouth-piece of the retort, and flows backward through such chambers or passages, from which, having been superheated yet more highly in its passage through them, it escapes or is discharged into the retort above, through the small apertures 1 1, by means of which the superheated steam is distributed in fine jets under and through the bed of incondescent coal or other decomposing material filling such retort. By forming such tile with both top and bottom surfaces, the steam does not come in direct contact with the bottom retort itself, but enters directly into the chambers $c\ c$, and passes from thence in immediate contact with the decomposing material.

By this or any equivalent construction of tile, if the bottom of the retort should by any means become cracked, the steam would not escape, nor would the operation of the process be seriously interfered with.

The decomposing retort A is best filled with ordinary American anthracite coal, selected as free of slate and sulphur as possible, which should be broken into pieces of about the size of an egg.

In connection or combination with such decomposing retort, there is a steam-superheater, E, and a steam-drier, F, through both of which the steam is caused to pass before it enters the distributing-tile D. The superheater, a sectional view of which is shown in Fig. 6, is made of an unchangeable material, similar to that used for the retort A, and is so constructed that steam, entering at a front end of a passage, $d$, flows to the back end of such superheater, and then returns to the front end through another passage, $e$, from whence it passes, by any suitable pipe, to the superheating and distributing tile in the bottom of the decomposing-retort. This superheater is placed horizontally in the hotter parts of the oven, and forms part of the setting of the bench. It can also be easily withdrawn or replaced, if needful, at any time, without arresting the action of the bench.

The steam-drier, a horizontal section of which is shown in Fig. 5, consists of a double pipe or tube, made of iron or other suitable material, one within the other, and the inner one of which, $f$, and which receives the steam, is placed at its back end, with numerous fine holes, from which the steam escapes into the outer tube $g$, from which it is conducted to the passage $d$ of the superheater E.

The steam, by its contact with the heated surfaces of the pipes $f\ g$, is deprived of its superabundant moisture before it passes to the superheater, where it is more thoroughly superheated before passing to the decomposing-retort. This steam-drier is placed near the base of the oven, and where the heats are quite moderate, while the clay superheater is in the hotter part of the oven, and imparts a temperature of full red-heat to the steam.

In the operation of making gas by the decomposition of water or steam, by the aid of incandescent metals or carbonaceous material, it has generally been the practice to introduce the steam or water into the retort containing the decomposing material in a large stream or volume, thus bringing water as such, or steam holding water in mechanical suspension, and far below the temperature required for decomposing the same, into carbonic-oxide and hydrogen gases, thereby producing carbonic-acid gas, and also lowering the temperature of the carbon-retort by abstracting the heat needful for evaporation of wet steam and water, and thus involving an unsteady and wholly unsatisfactory flow of the gases resulting from the more or less incomplete decomposition of water, and also serious loss in the whole process.

These objections are overcome or removed by the use of the perforated tile bottom in combination with the steam drier and superheater, which secures the arrival to the decomposing-retort of the vapor of water superheated to that degree that the bonds of chemical affinity between the constituent gases are already greatly weakened, and the work of decomposition due to the action of the heated carbon is reduced to a point at which carbonic oxide, and not carbonic acid, is steadily produced or evolved in company with free hydrogen gas, a result impossible to be attained regularly otherwise.

The operation or process is as follows: The decomposing-retort A being filled preferably with anthracite coal or any fixed form of carbon, and the other retorts B and C with bituminous coal or other suitable material, steam, supplied from a boiler, either heated by the waste heat of the benches or otherwise, is introduced into the inner tube $f$ of the steam-drier, and passes thence, through the outer tube of such drier, to the superheater, where it is highly superheated, and from whence it enters the passages $c\ c$ in the perforated tile D. Here it is still further heated and then distributed, by means of the small apertures 1 1 in such tile, in fine streams among the mass of incandescent anthracite coal lying over and above such perforated tile. The decomposing-retort being kept at a high heat, an immediate decomposition of the steam is effected without reduction of the temperature of the retort or of its contents, thus securing a constant supply of the desired gases. The gases thus obtained pass from the decomposing-retort, which is not provided with the ordinary stand-pipes, through the pipes h h, into the mouth-pieces of the bituminous retorts B and C, or, by flues or proper pipes, to the rear end of the bituminous-coal retorts, where they meet and combine with the vapors and gases eliminated from the coal or other suitable gas-yielding substance, before these illuminant vapors reach the points of condensation in the hydraulic main or are lost in the coal-tar. The gases from the decomposing-retort are supplied to one bituminous retort until the rich carbon vapors pass off, when they are shut off by a cock, 3, and turned into the other bituminous retort for the necessary time, or until its rich carbon vapors pass off, the bituminous retorts being charged separately—at intervals, say, of every two hours—and their charges being distilled during the last part or half of the time without any supply of gases from the decomposing-retort. The arrangement of the cocks or valves 3 3 in the pipes h h connecting the decomposing with the bituminous retorts also permits each bituminous retort to be entirely shut off from the other retorts when desired. If, instead of the common caking coals, rich cannel coals are used in the bituminous retorts, a more copious or larger supply of gases from the hydrogen or decomposing retort will be necessary.

It is found that, although hydrogen gas is produced in the decomposing-retort in excess of what would be required in the composition of a good carbureted-hydrogen illuminating-gas, yet the completed gas—that is, the united gases from the steam or decomposing and from the bituminous retorts—when mingled as herein described, is proved by analysis to contain no excess of hydrogen, as compared with good illuminating-gas produced by the common process, thus demonstrating the fact that the hydrogen and carbonic oxide obtained from the decomposition of watery vapor furnish to the nascent and distilling hydrocarbon vapors of the bituminous coal-retorts a most appropriate substratum for a permanent illuminating-gas of high quality, enriched by and obstinately clinging to the illuminants lost by the common process in the coal-tar, producing from even common caking coals a largely-increased value of total economical effect, at a very unimportant increase of cost, the gas thus produced exceeding ordinary coal-gas in its purity, and much more so in its power to withstand, without sensible loss of illuminating power, long-continued exposure to low temperatures, as in winter months, in holders or pipes of distribution; and even when such gas is purposely subjected for a length of time to extreme degrees of artificial cold, in an apparatus specially designed for the purpose, its loss of power is not more than nine or ten per cent., while by the same treatment street-gas made by the common process loses over thirty per cent. of its illuminating power—a fact equally new and valuable.

Morever, by our process the purification of gas from ammonia and carbonic acid is greatly facilitated, adding to the force of the position that the gas as produced by our invention and improvements is substantially a new product, hitherto unknown to those skilled in the art.

As the high temperature of the pipes h h tends to expand the valves 3 3, such valves or cocks are best made conical or tapering, that form rendering it both easy to tighten them in their seats, and also remove them, when necessary.

The mode of directing and controlling the supply of the hydrogen and carbonic-oxide gases to the bituminous retorts by means of tubes and pipes furnished with valves or stop-cocks, so as to render it easily possible to admit or shut off such gases at pleasure, is found all-important to the successful working of the process and the production of an illuminating-gas of uniform composition and permanent character.

The flow of steam from the boiler to the steam drier and superheater and decomposing-retorts may be regulated and controlled by means of wheel or suitable cocks in the steam-supply pipe, the workmen in charge of the stoking acquiring with ease the skill required to turn on or off the volume or amount of steam required.

If, instead of one hydrogen or decomposing retort and two bituminous-coal or carbon retorts, the bench be composed of five or six retorts, two of which should be hydrogen-retorts, provided with necessary steam driers and superheaters, and suitably connected with the bituminous-coal retorts by means of tubes with valves or cocks, as before described, the operation will be substantially the same.

If, for any reason, it is more convenient to separate the retorts for decomposing the superheated steam from the carbonizing or bituminous retorts, the anthracite-retorts may be set apart in a bed or bench by themselves, heated by a separate fire, and the products of decomposition carried to the bituminous retorts substantially in the manner already described.

What we claim as our invention, and desire to secure by Letters Patent, is—

1. The use and application of a clay retort for decomposing superheated steam, for the purposes set forth, in combination with a steam receiving and distributing tile, D, substantially as described.

2. The steam receiving and distributing tile D, constructed with steam-passages between its top and bottom surfaces, and having its upper surface perforated, substantially as and for the purposes set forth.

3. The combination of a clay decomposing-retort, A, fitted with a steam receiving and distributing tile or bottom, with one or more bituminous-coal retorts, for the purposes set forth.

4. The combination of the decomposing-retort A, fitted with a suitable steam receiving and distributing tile or bottom, and steam-superheater E, and steam-drier F, substantially as and for the purposes set forth.

5. Connecting the decomposing-retort with the several bituminous-coal retorts by means of separate pipes h h, fitted with valves or cocks 3 3, substantially as and for the purposes set forth.

6. The combination and arrangement, for the purpose of producing illuminating-gas or gas for heating purposes, of the mechanism or apparatus described, its several parts combined and operating substantially as set forth.

7. The mode or process of making illuminating-gas, by first depriving steam of its superabundant moisture by means of a drier, and then highly superheating such dried steam, and afterward decomposing such steam by means of incandescent anthracite coal or other suitable material, the steam being distributed in fine jets or currents through such decomposing material, and then mixing or uniting the gases produced from such decomposition of the superheated steam with the gases or vapors eliminated in separate retorts from bituminous coal or other suitable gas-yielding substance.

GEO. W. HARRIS.
H. HOLDREGE.

Witnesses:
S. D. LAW,
F. E. VAN AUKEN.